United States Patent [19]

Venkataramani et al.

[11] Patent Number: 5,693,700

[45] Date of Patent: Dec. 2, 1997

[54] FLAME RETARDANT POLYMER COMPOSITIONS

[75] Inventors: Venkat Subramaniam Venkataramani, Clifton Park, N.Y.; Jeremy Paul Shaw, Halsteren, Netherlands

[73] Assignee: General Electric Company, Schenectady, N.Y.

[21] Appl. No.: 801,135

[22] Filed: Mar. 7, 1997

Related U.S. Application Data

[63] Continuation of Ser. No. 509,146, Jul. 31, 1995, abandoned.

[51] Int. Cl.$^6$ ............................ C08K 3/32; C08K 3/36; C08K 3/38
[52] U.S. Cl. .................. 524/405; 524/80; 524/403; 524/410; 524/413; 524/417; 524/418; 524/423; 524/494; 524/588
[58] Field of Search .................. 524/80, 403, 405, 524/410, 413, 417, 423, 418, 494, 588

[56] References Cited

U.S. PATENT DOCUMENTS

| | | | |
|---|---|---|---|
| 3,249,534 | 5/1966 | Ware | 524/405 |
| 3,290,266 | 12/1966 | Barnes et al. | 524/80 |
| 3,510,446 | 5/1970 | Junger et al. | 524/417 |
| 3,518,222 | 6/1970 | Ostrowski | 524/410 |
| 3,732,181 | 5/1973 | Ray et al. | 524/417 |
| 3,868,346 | 2/1975 | Merrill | 524/405 |
| 3,983,082 | 9/1976 | Pratt et al. | 524/417 |
| 4,079,022 | 3/1978 | Ferraini, Jr. et al. | 524/417 |
| 4,216,136 | 8/1980 | Stayner | 524/405 |
| 4,371,655 | 2/1983 | Kroenke | 524/423 |
| 4,544,695 | 10/1985 | Myers | 524/417 |
| 5,043,369 | 8/1991 | Bahn et al. | 524/494 |
| 5,047,449 | 9/1991 | Pastureau | 524/588 |
| 5,367,012 | 11/1994 | Aitkin et al. | 524/417 |
| 5,451,632 | 9/1995 | Okumura et al. | 524/423 |
| 5,578,659 | 11/1996 | Anada et al. | 524/436 |

FOREIGN PATENT DOCUMENTS

| | | |
|---|---|---|
| 924835 | 4/1973 | Canada. |
| 526162 | 2/1993 | European Pat. Off.. |
| 2543849 | 4/1977 | Germany. |
| 61-171778 | 8/1986 | Japan. |
| 5-179123 | 7/1993 | Japan. |
| 2193216 | 2/1988 | United Kingdom. |

OTHER PUBLICATIONS

WO 94/11455—26 May 1994, Vispak Limited.
U.S. patent application Serial No. 08/509,278, filed Jul. 31, 1995.
U.S. patent application Serial No. 08/558,562, filed Nov. 1, 1995.

*Primary Examiner*—Veronica P. Hoke
*Attorney, Agent, or Firm*—William H. Pittman

[57] ABSTRACT

A metal borate, metal phosphate or metal borophosphate in combination with either a metal sulfide or sulfur polysiloxanes are incorporated into polymer systems to produce a polymer composition which unexpectedly displays flame retardant properties without creating environmental hazards.

13 Claims, No Drawings

FLAME RETARDANT POLYMER COMPOSITIONS

This application is a Continuation of application Ser. No. 08/509,146 filed Jul. 31, 1995 now abandoned.

FIELD OF THE INVENTION

The instant invention is directed to polymer compositions. The polymer compositions comprise novel inorganic compositions and they unexpectedly display flame retardant properties without creating environmental hazards.

1. Background of the Invention

Compositions which comprise polyphenylene sulfides, polyamides and/or polyphenylene ethers (PPE), for instance, constitute an invaluable class of engineering materials. Materials of such are characterized by a unique combination of chemical, physical and electrical properties. For instance, they are resistant to many solvents and generally have high impact strengths. As a result of this unique combination of properties, polyphenylene ethers, polyphenylene sulfides and polyamide materials are suitable for a broad range of commercial applications.

Moreover, as a result of said properties, and particularly their characteristic hydrolytic stability, dimensional stability and dielectric properties, it has been of increasing interest to prepare materials of the above-described which also display flame retardant properties. The flame retardant properties are typically obtained by employing additives such as halogenated compounds, antimony containing compounds and/or red phosphorus which invariably create severe environmental hazards.

This invention, however, is directed to polymer compositions which comprise novel inorganic compositions and they unexpectedly display flame retardant properties without creating environmental hazards.

2. Description of the Prior Art

Efforts have been disclosed for producing polymer compositions. In U.S. Pat. No. 5,043,369, glass/glass-ceramic-plastic alloy articles are described.

Other attempts have been made to prepare polymer compositions. In U.S. Pat. No. 4,544,695, polymeric flame retardant compositions comprising phosphate-sulfate glass compositions are described.

Still other investigators have focused on the production of polymer compositions. In U.S. Pat. No. 4,079,022, fire retardant resin compositions containing moisture resistant low melting phosphate glass is described.

SUMMARY OF THE INVENTION

In a first aspect, the instant invention is directed to a first metal composition comprising:

(1) at least one member selected from the group consisting of metal sulfides and elemental sulfur;

(2) at least one member selected from the group consisting of metal borates, metal borophosphates and metal phosphates; and (3) polysiloxanes.

In a second aspect, the instant invention is directed to a first polymer composition comprising:

(A) the first metal composition described above; and (B) a polymer system selected from the group consisting of immiscible polymer blends, miscible polymer blends, copolymers, thermoplastic polymers and thermosetting polymers.

In a third aspect, the instant invention is directed to a second metal composition comprising:

(a) at least one member selected from the group consisting of group II-A sulfides, group II-B sulfides, tin sulfide, iron sulfide, titanium sulfide, copper sulfide, bismuth sulfide and elemental sulfur;

(b) at least one member selected from the group consisting of group I-A borates, group I-A phosphates, group II-A borates, group II-A phosphates, group II-A borophosphates, group II-B borates, group II-B phosphates, group II-B borophosphates, group IV-B phosphates, aluminum phosphates, iron phosphates, bismuth phosphates, tin phosphates, zirconium phosphates and titanium phosphates; and (c) polysiloxanes.

Moreover, it is within the scope of this invention that said second metal compositions consist essentially of the members described in (a), the members described in (b) and the polysiloxanes described in (c) and it is further within the scope of this invention that the novel compositions consist of the members described in (a), the members described in (b) and the polysiloxanes described in (c).

In a fourth aspect, the instant invention is directed to a second polymer composition comprising:

(i) the second metal composition described above; and (ii) a polymer system selected from the group consisting of immiscible polymer blends, miscible polymer blends, copolymers, thermoplastic polymers and thermosetting polymers.

DETAILED DESCRIPTION OF THE PREFERRED EMBODIMENTS

There is no limitation with respect to the preparation of the members described in (a) and (b). For instance, some may be prepared via conventional techniques which include neutralization reactions, and they may be naturally occurring and/or commercially available, amorphous or crystalline. Moreover, any combination of the members of (A) and (B) or (a) and (b) may be selected as long as the compounds are stable enough to result in the desired compositions.

There is no limitation with respect to the amount of the members of (a) and (b) present in the second metal composition. Often, however, they are in a weight ratio of about 1:99 wt % (a) to about 99:1 wt % (b) based on total weight of the members of (a) and (b) present in the second metal composition. Preferably, the second metal compositions are in a weight ratio of about 20:80 wt % (a) to about 80:20 wt % (b) based on total weight of the members of (a) and (b) present in the second metal composition. Moreover, it is often preferred that the member selected in (a) is zinc sulfide and the member selected in (b) is zinc borate, hydrate or anhydrous.

There is essentially no limitation with respect to the polysiloxanes employed in this invention. They include polysiloxanes and siloxane copolymers such as polyphenylene ether and polyetherimide copolymers. The preferred polysiloxanes are commercially available and often represented by the formula

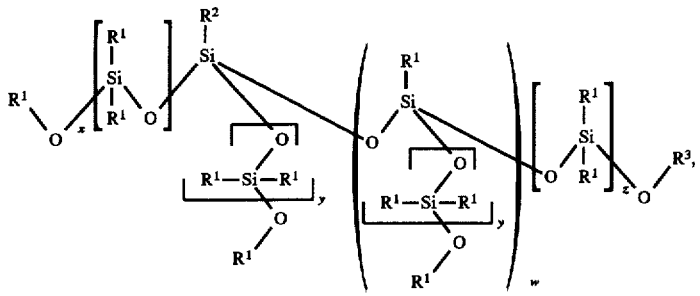

wherein each $R^1$ is independently a $C_{1-5}$ alkyl group and preferably a methyl group and $R^2$ is a $C_{1-5}$ alkyl group or a primary or secondary aminoalkyl group such as a N-(2-aminoalkyl)-3-aminoalkyl group, provided that $R^2$ is a $C_{1-5}$ alkyl group when w is 1 and a N-(2-aminoalkyl)-3-aminoalkyl group when w is 0. It is often preferred that $R^2$ is a methyl group or a N-(2-aminoethyl)-3-aminopropyl group. $R^3$ is hydrogen or a $C_{1-5}$ alkyl group, preferably a methyl group, w is 0 or 1 and x and y are each independently an integer from 1 to 7 and z is an integer from 0 to 7. It is noted herein that any combination of compounds represented by formula I may be employed.

It is also within the scope of the invention to employ polysiloxanes represented by the formulae

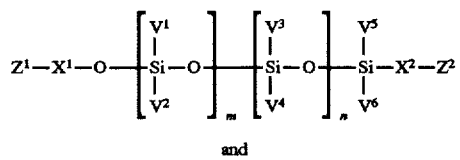

and

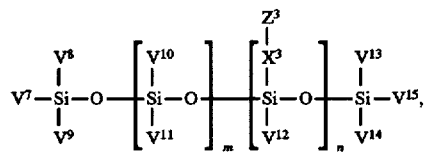

wherein m+n has a value of 5–2000, $V^1$–$V^{15}$, each independently of each other, represent a hydrogen atom or one of the following groups having 1–12 carbon atoms: alkyl, alkoxy, alkenyl, aryl, aralkyl, alkylaryl, which groups may be halogenated; wherein $X^1$, $X^2$, $X^3$, each independently of each other, represent one of the following groups: alkylene, cycloalkylene, arylene, aralkylene, alkylarylene; wherein $Z^1$, $Z^2$, $Z^3$ each represent one of the following groups: —$NV^{16}V^{17}$, —NH—$(CH_2)_q$—$NV^{16}V^{17}$ in which q has a value of 1–10 and $V^{16}$ and $V^{17}$, each independently of each other, represent a hydrogen atom or an alkyl group having 1–12 carbon atoms, an aliphatic or cycloaliphatic epoxide, a carboxylic acid or anhydride group, $Z^1$ or $Z^2$ is a hydrogen atom, in which, however, the compound of formula II may not comprise simultaneously an amine group and an epoxide group or not simultaneously an amino group and a carboxylic acid group, or not simultaneously an epoxide group and a carboxylic acid or anhydride group.

The amount of polysiloxane in the second metal composition is not limited. It is often no more than about 20% by weight and preferably no more than about 5.0% by weight and most preferably no more than about 2.0% by weight based on total weight of the second metal composition.

There is no limitation with respect to the immiscible polymer blends, miscible polymer blends, copolymers, thermoplastic polymers or thermosetting polymers (hereinafter all referred to as polymer systems) employed in this instant invention other than that they are able to form a composition with the second metal composition comprising the members in (a), (b) and (c) described above. Illustrative examples of the polymer systems that may be employed in this invention include any of those, for instance, which comprise polyphenylene ethers in combination with polyolefins, polyamides, polyarylene sulfides, polyesters, acrylonitrile butadiene styrene copolymers, polystyrenes or polyetherimides. Polycarbonates in combination with polyesters like poly(butylene terephthalate) may also be employed. The preferred thermoplastic polymers employed in this invention include homopolymers of polyarylene sulfides such as polyphenylene sulfide, polycarbonates, which are bisphenol A polycarbonates, polyolefins, polyamides, polyesters such as poly(ethylene terephthalate) and poly(butylene terephthalate) as well as unfunctionalized polyphenylene ether homopolymers, unfunctionalized polyphenylene ether copolymers and functionalized polyphenylene ether homopolymers and copolymers. The thermosetting polymers are not limited and often include polyurethanes and polyepoxides.

It is noted herein that any of the polymers employed in this invention, which are used to form the immiscible blends, miscible blends or copolymers, may be unfunctionalized or functionalized in the typical ways known in the art. Such functionalization is not limited and can include, for instance, functionalization with citric acid, maleic anhydride, fumaric acid, epoxides, trimellitic acid chloride anhydride, α- or β-unsaturated amides or lactams and the like provided that a polymer composition can be formed.

The polyphenylene ether portion of the polymer systems that may be employed in this invention often include both homopolymer and copolymer polyphenylene ethers. Suitable homopolymers are those which contain, for example, 2,6-dimethyl-1,4-phenylene ether units. Suitable copolymers include, for instance, graft, block or random copolymers containing such units in combination with 2,3,6-trimethyl-1,4-phenylene ether units. Such a portion is typically prepared by oxidative coupling at least one corresponding monohydroxyaromatic compound. Moreover, any of the conventional polyphenylene ether impact modifiers/additives may be employed in this invention. They include, for example, rubbery interpolymers of ethylene and α-olefins, AB (diblock) and ABA (triblock) copolymers and core-shell graft copolymers of alkenylaromatic and diene compounds, especially those comprising styrene and butadiene or isoprene blocks. Additionally, suitable lubricants such as hydrogenated poly(α-olefins) may be employed as well as talc additives, functionalized elastomers and reinforcing and non-reinforcing fillers.

It is often preferred that the above-described polyphenylene ether portion of the polymer systems is combined with a base polymer consisting essentially of structural units derived from olefinically unsaturated monomers including ethylene, propylene, isobutene, styrene, butadiene, isoprene, chloroprene, vinylchloride, vinyldiene chloride or combinations thereof.

The polymer systems comprising polyphenylene ethers and polyolefins may be prepared, for instance, by first reacting functionalized polyphenylene ether and polyolefins to form polyphenylene ether-polyolefin copolymers which in turn are useful as compatibilizers for polymer blends of the same. A more detailed description of such may be found in Re 34,799, the disclosure of which is incorporated herein by reference.

Other preferred polymer systems that may be employed in this invention include those comprising polyphenylene ethers and polyamides. They may be produced by any conventional method satisfactorily employed in the art. Generally, however, melt blending methods are desired. A more detailed and typical description of the production of polyphenylene ether/polyamide polymer systems that may be employed in this invention is described in U.S. Pat. No. 4,826,933, the disclosure of which is incorporated herein by reference. Additionally, it is noted herein that polyamides are intended to include toughened or super tough polyamides such as those prepared in accordance with, for instance, U.S. Pat. Nos. 4,174,358, 4,474,927, 4,346,194 and 4,251,644, herein incorporated by reference. Typical polyamides employed include polyamides 4/6, 6, 6/6, 11, 12, 6/3, 6/4, 6/10, 6/12 and nylon compounds comprising aromatic groups derived from terephthalates and isophthalates.

Still other preferred polymer systems which may be employed in this invention include those comprising polyphenylene ether and polyesters. Such polymer systems are typically prepared by melt blending polyphenylene ethers with polyesters such as poly(ethylene terephthalate), poly(butylene terephthalate), liquid crystalline polyesters, poly(butylene naphthalenedicarboxylate) and poly(ethylene naphthalenedicarboxylate). A typical process for such is described in detail in U.S. Pat. No. 5,281,667, the disclosure of which is incorporated herein by reference.

Additional preferred polymer systems which may be employed in this invention include those which comprise polyphenylene ethers and polyarylene sulfides such as polyphenylene sulfide. Such polymer systems are prepared, for instance, by the reaction of epoxy functionalized polyphenylene ether compositions with polyphenylene sulfide containing epoxide-reactive functional groups. A detailed description of such preparation may be found in U.S. Pat. No. 5,122,578, the disclosure of which is incorporated herein by reference.

In a preferred embodiment of this invention it may be desirable to add group II-A or II-B sulfates as composition fillers, and barium sulfate is often preferred. In another preferred embodiment of the instant invention, it may be desirable to add aluminas and/or silicas to enhance the hydrolytic stability of the compositions, wherein said compositions in all four aspects of this invention. Moreover, charring promoters may also be employed and they include, for example, melamines like melamine formaldehyde, and formaldehyde resins like phenol formaldehyde. Further, pigments/opacifiers like $TiO_2$ may also be used to color/fill the desired compositions, and it is within the scope of this invention to employ IR reflectors and char supporters.

There is essentially no limitation with respect to the method for producing the polymer compositions of this invention. Often, however, the polymer compositions are prepared by adding the members of (a), (b) and (c) to polymer powders followed by compounding in a melt reactor like a mixing extruder.

There is essentially no limitation with respect to the amount of novel composition comprising the members of (a), (b) and (c) added to the polymer compositions of this invention. Often, no more than about 20% by weight and preferably no more than about 10% by weight and most preferably no more than about 5% by weight of the novel composition is added based on total weight of the polymer composition.

When silicas and/or aluminas are added to the novel compositions or polymer compositions, they often comprise less than 10% by weight and preferably less than about 5% by weight of the total weight of the respective compositions.

In the instant invention, flame retardant properties are defined to mean that UL-94 is V-0, V-1 or V-2 at 1.6 mm in accordance with ASTM UL-94 specifications. Such properties are unexpectedly obtained without requiring the use of environmentally unfriendly additives including halogenated compounds, red phosphorus and antimony oxides.

The following Example is provided to further illustrate and facilitate the understanding of the instant invention. All products may be confirmed via conventional techniques including proton and carbon-13 nuclear magnetic resonance spectroscopy, infrared spectroscopy and x-ray techniques.

EXAMPLE

A flame retardant composition was prepared by mixing 40% polyphenylene ether, 51.4% Nylon 6,6, 0.7% citric acid (functionalizing agent), 2.0% polysiloxane (having a mixture of four components in a ratio of 2:3:2:1 depicted by formula I and below) (w=0; x, y, z=5; $R^1$=methyl groups; $R^2$=N-2-(aminoethyl)-3aminopropyl group/w=0; x, y, z=5; $R^1$=methyl groups; $R^2$=methyl group/w=0; z=0; y=5; $R^1$=methyl groups; $R^2$=methyl groups; $R^3$=hydrogen/w=1; x, y, z=5; $R^1$=methyl groups; $R^2$=methyl group), 0.8% zinc sulfide, 0.8% zinc borate, 3.5% $TiO_2$ and 0.8% barium sulfate to produce a mixture (all percentages are by weight based on total weight of the composition). The mixture was compounded in a twin screw extruder operating at barrel set temperatures of about 320° C. and a screw speed of about 300 rpm. The resulting polymer composition pellets were injection molded into 1.6 mm thick ASTM UL-94 burn test bars. Burn tests were conducted and the test bars had UL-94 ratings of V-1 at 12.0 seconds.

The data in the following table is provided to further demonstrate the unexpected and superior properties displayed by the compositions of this invention: All compositions were prepared in a manner similar to the one described in the example, and "premix" as used herein is defined to mean a mixture of PPE, nylon and functionalizing agent and polysiloxanes if present.

TABLE

| Entry[a] | Metal/wt % Sulfides | Metal/wt % Borates | Metal/wt % Additives[c] | Flame Retarding[d] |
|---|---|---|---|---|
| Control 1 | None | None | None | HB |
| Control 2 | None | None | None | HB |
| 1 | None | None | B/5.0 | V-2 |
| 2 | None | Zn/5.0 | None | V-1 |
| 3 | Zn/5.0 | None | B/5.0 | V-2 |
| 4 | Zn/5.0 | Zn/5.0 | None | HB |
| 5 | Zn/5.0 | Zn/5.0[b] | None | V-0 |
| 6 | Zn/1.5 | Zn/5.0 | B/3.5 | V-1 |
| 7 | None | Zn/5.0 | B/5.0 | V-2 |
| 8 | Zn/3.3 | Zn/3.3 | B/3.3 | V-1 |
| 9 | Zn/1.7 | Zn/1.7 | B/1.7 | V-1 |

TABLE-continued

| Entry[a] | Metal/wt % Sulfides | Metal/wt % Borates | Metal/wt % Additives[c] | Flame Retarding[d] |
|---|---|---|---|---|
| 10 | Zn/0.8 | Zn/0.8 | T/3.5;B/0.8 | V-1 |
| 11 | Zn/1.0 | Zn/1.0 | T/3.5;B/1.0 | V-0 |

[a]Weight percent PPE, all entries contain 40% except Control 1 = 50% and no polysiloxane and made with a premix; Control 2 = 49% and made with a premix; entries 6 and 7 = 45% and prepared with a premix; entry 11 = 42%.
[b]All flame retardant polymer compositions were made with hydrated zinc borate except the composition in entries 6 and 11 which was prepared with an anhydrous zinc borate.
[c]B = barium sulfate and T = titanium dioxide.
[d]Flame retardancy results at 1.6 mm.

What is claimed is:

1. A polymer composition comprising:

(A) an amount effective to provide flame retardance of a metal composition comprising:

(1) at least one member selected from the group consisting of metal sulfides and elemental sulfur;

(2) at least one member selected from the group consisting of metal borates, metal borophosphates and metal phosphates; and (3) polysiloxanes; and (B) a polymer system comprising polyphenylene ethers in combination with a polymer selected from the group consisting of polyamides, polyolefins, polyarylene sulfides, polyesters, acrylonitrile butadiene styrene copolymers, polystyrenes and polyetherimides.

2. A polymer composition comprising:

(i) an amount effective to provide flame retardancy of a metal composition comprising:

(a) at least one member selected from the group consisting of group II-A sulfides, group II-B sulfides, tin sulfide, iron sulfide, titanium sulfide, copper sulfide, bismuth sulfide and elemental sulfur;

(b) at least one member selected from the group consisting of group I-A borates, group I-A phosphates, group II-A borates, group II-A phosphates, group II-A borophosphates, group II-B borates, group II-B phosphates, group II-B borophosphates, group IV-B phosphates, aluminum phosphates, calcium phosphates, iron phosphates, bismuth phosphates, tin phosphates, zirconium phosphates, titanium phosphates; and (c) polysiloxanes; and (ii) a polymer system comprising polyphenylene ethers in combination with a polymer selected from the group consisting of polyamides, polyolefins, polyarylene sulfides, polyesters, acrylonitrile butadiene styrene copolymers, polystyrenes and polyetherimides.

3. A polymer composition in accordance with claim 2 wherein the member in (a) is a II-B sulfide and the member in (b) is a II-B borate.

4. A polymer composition in accordance with claim 2 wherein said group II-B sulfide is zinc sulfide and said group II-B borate is zinc borate.

5. A polymer composition in accordance with claim 2 wherein said polysiloxanes are represented by the formula

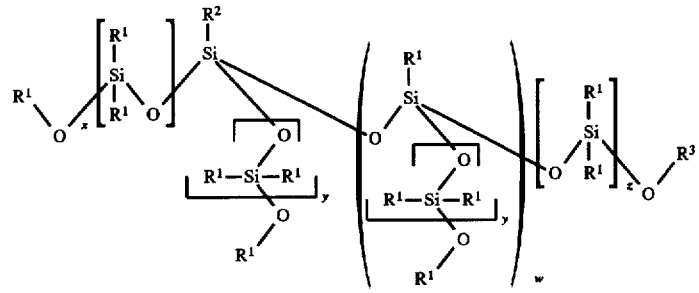

and each $R^1$ is independently a $C_{1-5}$ alkyl group and $R^2$ is a $C_{1-5}$ alkyl group or a N-(2-aminoalkyl)-3-aminoalkyl group, provided that $R^2$ is a N-2-(2-aminoalkyl)-3-aminoalkyl group when w is 0 and $R^3$ is hydrogen or a $C_{1-5}$ alkyl group and w is 0 or 1 and x and y are each independently an integer from 1 to 7 and z is an integer from 0 to 7.

6. A polyamide composition in accordance with claim 5 wherein $R^2$ is a methyl group or a N-(2-aminoethyl)-3-aminopropyl group.

7. A polymer composition in accordance with claim 2 wherein said polymer system comprises polyphenylene ethers and polyamides.

8. A polymer composition in accordance with claim 2 wherein said polymer system comprises polycarbonates and polyesters.

9. A polymer composition in accordance with claim 8 wherein said polycarbonates are bisphenol A polycarbonates, said polyesters are poly(butylene terephthalates).

10. A polymer composition in accordance with claim 7 wherein said polyphenylene ethers comprise 2,6-dimethyl-1,4-phenylene ether units and said polyamides are Nylon 6/6.

11. A polymer composition in accordance with claim 2 wherein said polymer composition further comprises group II-A or II-B sulfates.

12. A polymer composition in accordance with claim 11 wherein said group II-B sulfates are barium sulfate.

13. A polymer composition in accordance with claim 2 wherein said polymer composition further comprises aluminas or silicas.

* * * * *